United States Patent [19]
Scholder

[11] Patent Number: 5,918,956
[45] Date of Patent: *Jul. 6, 1999

[54] COMPUTER CABINET LATCHING MECHANISM

[75] Inventor: Erica Scholder, Austin, Tex.

[73] Assignee: Dell U.S.A., L.P., Round Rock, Tex.

[ * ] Notice: This patent issued on a continued prosecution application filed under 37 CFR 1.53(d), and is subject to the twenty year patent term provisions of 35 U.S.C. 154(a)(2).

[21] Appl. No.: 08/912,263

[22] Filed: Aug. 18, 1997

Related U.S. Application Data

[63] Continuation of application No. 08/698,817, Aug. 16, 1996, Pat. No. 5,743,606.

[51] Int. Cl.⁶ ................................................. A47B 81/00
[52] U.S. Cl. .................. 312/223.2; 312/222; 312/290; 292/80; 292/86; 361/725; 220/786
[58] Field of Search ............................. 312/222, 223.1, 312/223.2, 293.2, 290, 300, 111, 265.6; 361/683, 684, 724, 725, 726, 727; 220/323, 324, 780, 782, 786; 292/19, 80, 81, 83, 86, DIG. 37, 152

[56] References Cited

U.S. PATENT DOCUMENTS

| | | |
|---|---|---|
| 2,765,096 | 10/1956 | Sharp ....................................... 292/86 X |
| 4,215,796 | 8/1980 | Johnson et al. ...................... 220/786 X |
| 4,896,070 | 1/1990 | Reid et al. ............................... 312/290 |
| 4,909,579 | 3/1990 | Liu ....................................... 312/290 X |
| 5,197,789 | 3/1993 | Lin ....................................... 312/223.2 |
| 5,269,598 | 12/1993 | Liu ....................................... 312/223.2 |
| 5,348,356 | 9/1994 | Moulton ..................................... 292/80 |
| 5,564,804 | 10/1996 | Gonzalez et al. .................... 312/223.2 |
| 5,593,220 | 1/1997 | Seid et al. ............................ 312/265.6 |
| 5,626,406 | 5/1997 | Schmid ............................ 312/223.2 X |
| 5,722,748 | 3/1998 | Lajara et al. ..................... 312/223.2 X |
| 5,743,606 | 4/1998 | Scholder ............................... 312/223.2 |

Primary Examiner—Jose V. Chen
Assistant Examiner—James O. Hansen
Attorney, Agent, or Firm—Haynes and Boone, L.L.P.

[57] ABSTRACT

Apparatus for securing a computer cover to a computer chassis. In a preferred embodiment, a computer cover and computer chassis include a latching mechanism with components attached to each. The cover includes a button and a stop located adjacent to the button. The chassis includes a leaf spring so that, when the cover is closed onto the chassis, the leaf spring engages with the stop, thereby securing the cover to the chassis. Likewise, whenever the button is being depressed, such as by a user, the button pushes the leaf spring away from the stop. As a result, the leaf spring is no longer engaged to the stop and the cover can be easily opened from the chassis.

10 Claims, 3 Drawing Sheets

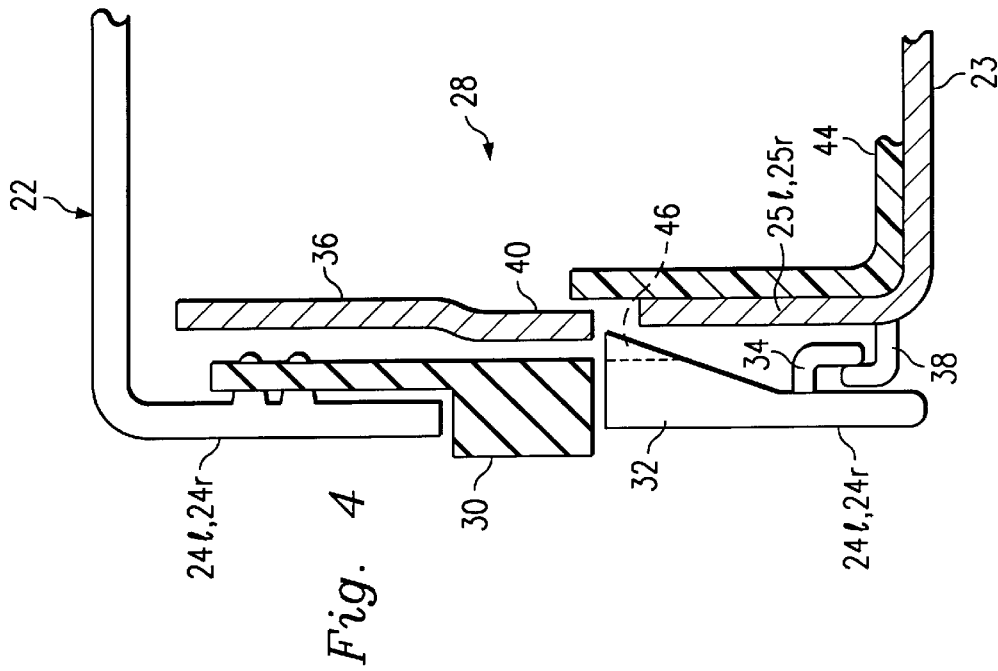
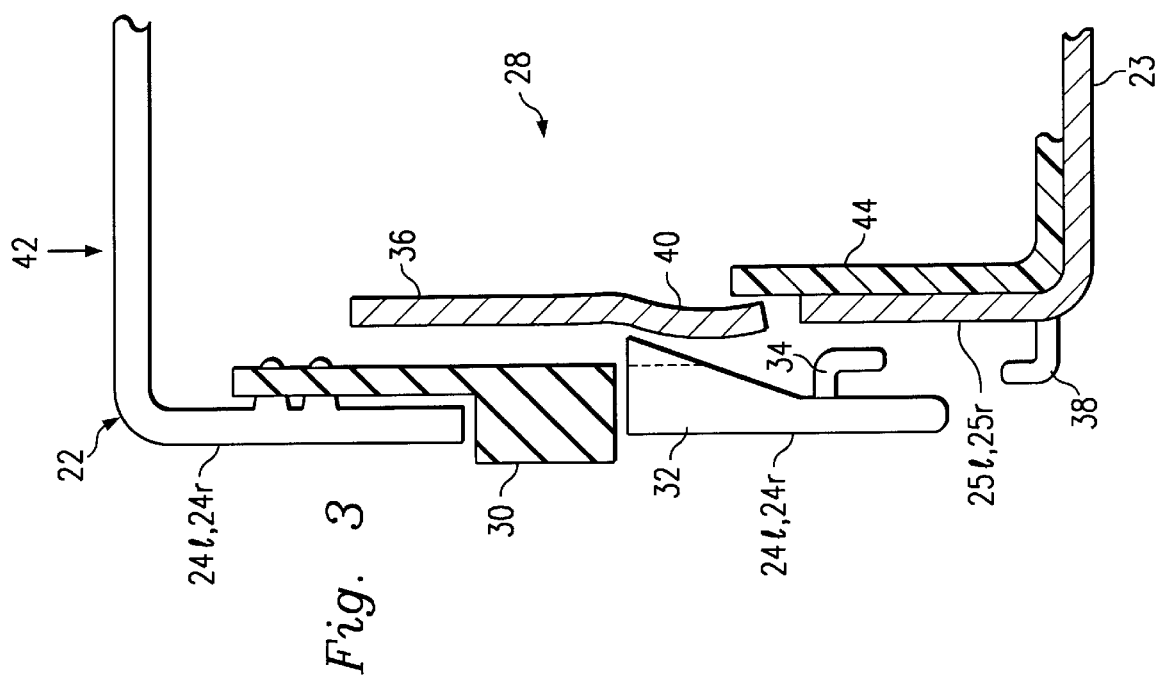

COMPUTER CABINET LATCHING MECHANISM

This is a continuation of application Ser. No. 08/698,817 filed on Aug. 16, 1996, now U.S. Pat. No. 5,743,606.

TECHNICAL FIELD

The invention relates generally to computer cabinet designs and more specifically, to a latching mechanism for securing a computer cover to a computer chassis.

BACKGROUND OF THE INVENTION

Most modern electronic components, such as personal computers and the like, are encased in a cabinet for storage and protection. A cabinet for such components typically comprises a chassis and a cover. The chassis is considered the base, or frame in which the components are stored, and the cover serves to protect the components from external forces, as well as to allow or prohibit access to the components.

In most cabinets, the cover is attached to the chassis by screws or screw-on latches. A typical screw-on latch includes a threaded hole in the chassis, and a matching hole in a portion of the cover that overlaps the threaded hole on the chassis. In this way, the cover can be attached to the chassis with screws, so that the components are adequately protected from damage that may occur from accidental separation of the chassis and cover. For example, a user may attempt to lift a personal computer by grabbing only the cover. If not for the cover being screwed to the chassis, the cover would become separated from the chassis, thereby exposing the components stored therein to potential damage.

Ease of use and low cost are two primary goals of computer cabinet design. However, screws or screw-on latches are adverse to those goals because they can be difficult to use and are relatively expensive. For instance, screws or screw-on latches take a long time to attach or detach. Screws can become misaligned, thereby damaging either the cover or the chassis. Cabinets with screwed on covers require extra time to assemble. Screws themselves are extra parts whose inventory must be maintained by the computer manufacturer. Furthermore, threading the screwholes into the computer chassis is an expensive manufacturing process.

In order to circumvent some of the drawbacks of using screws or screw-on latches, some computer manufacturers utilize clips to secure the cover to the chassis. However, the clips are typically unreliable, especially after repeated use. Also, the clips can be easily damaged due to misalignment.

Therefore, what is needed is a latching mechanism that provides a reliable and secure connection of a computer cover to a computer chassis.

Furthermore what is needed is a latching mechanism that is easy to use, and is relatively inexpensive.

SUMMARY OF THE INVENTION

The foregoing problems are solved and a technical advance is achieved by a method and apparatus for securing a computer cover to a computer chassis. In a preferred embodiment, a computer cover and computer chassis include a latching mechanism with components attached to each. The cover includes a button and a stop located adjacent to the button. The chassis includes a leaf spring so that, when the cover is closed onto the chassis, the leaf spring engages with the stop, thereby securing the cover to the chassis. However, whenever the button is being depressed, such as by a user, the button pushes the leaf spring away from the stop. As a result, the cover is no longer secured to the chassis and can be easily opened from the chassis.

The preferred embodiment also includes a hinge attached between the cover and chassis. The hinge helps to secure the cover to the chassis, and allows the cover to be rotated up and away from the chassis whenever the cover is being opened.

A technical advantage achieved with the invention is that it provides a reliable and secure connection of a computer cover to a computer chassis.

Another technical advantage achieved with the invention is that it is easy to use, and is relatively inexpensive.

BRIEF DESCRIPTION OF THE DRAWINGS

FIGS. 3–4 are closeup views of the latching mechanism of FIG. 1 during different stages of the cover being closed onto the chassis.

DESCRIPTION OF THE PREFERRED EMBODIMENT

Figure 1:
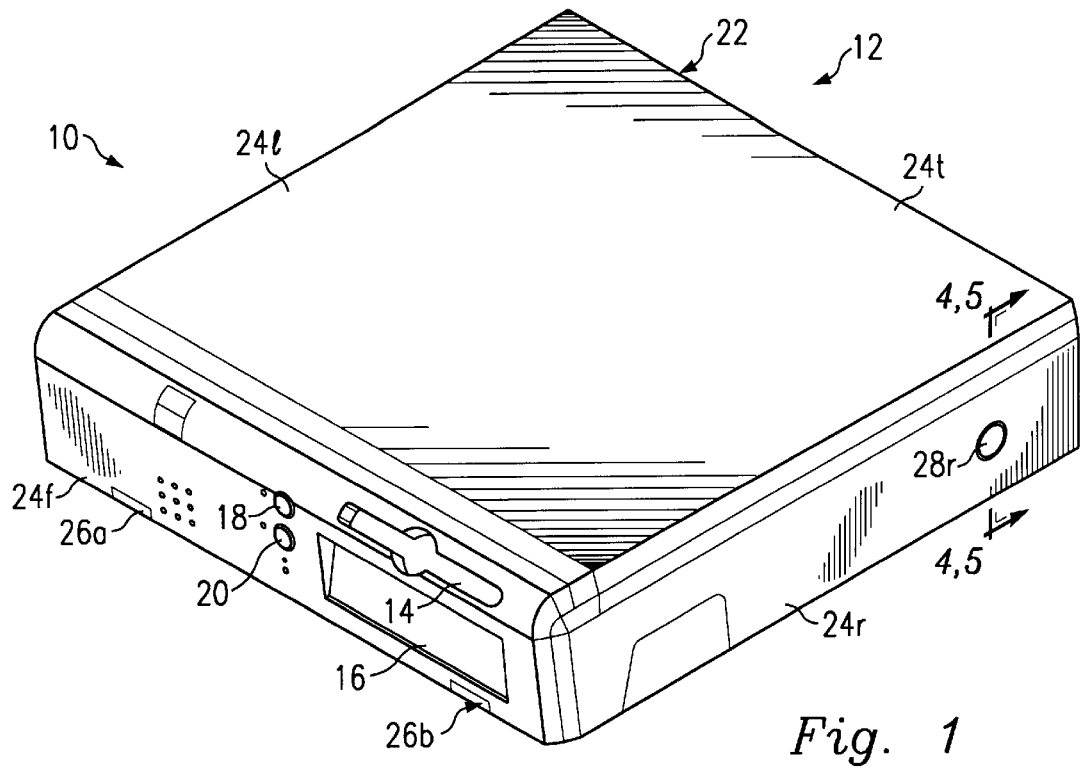
FIG. 1 is a front perspective view of a computer cabinet with the cover closed onto the chassis and secured with a latching mechanism of the present invention.

Referring to FIG. 1, the reference numeral 10 refers to a desktop computer, though it may also refer to a tower computer, a laptop computer, a file server, a mainframe computer, or the like. The computer 10 includes a cabinet 12 for storing and supporting various electronic components (not shown). In the preferred embodiment, the cabinet 12 includes a pair of drive bays 14, 16 and a pair of buttons 18, 20, all of which are conventional on most computer cabinets.

Figure 2:
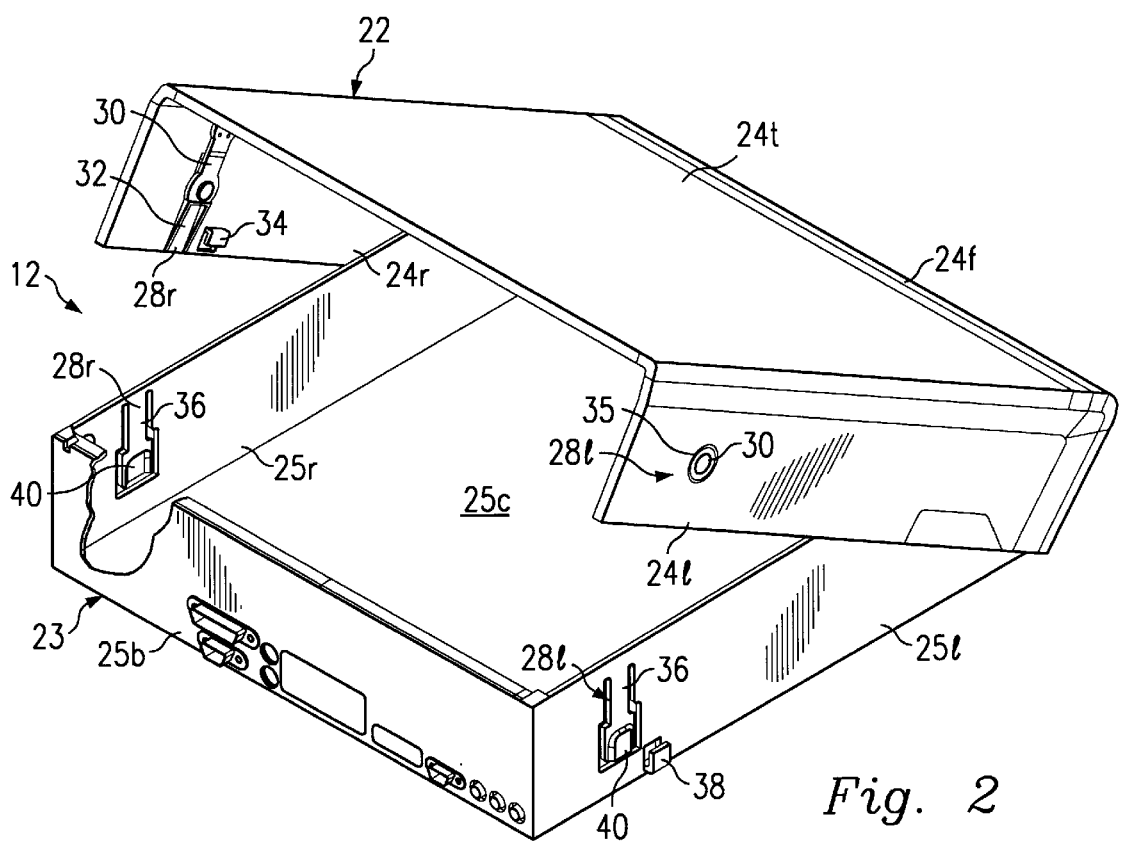
FIG. 2 is a rear perspective view of the computer cabinet and latching mechanism of FIG. 1, with the cover open from the chassis.

Referring also to FIG. 2, the cabinet comprises a cover 22 and a chassis 23. In the cabinet configuration of FIG. 1, the cover 22 is placed over and on top of the chassis 23 and therefore hides the chassis from view. In the cabinet configuration of FIG. 2, the cover 22 is opened away from the chassis 23, thereby exposing a portion of the chassis, as well as an interior area of the cabinet 12 in which the electronic components may be stored.

The cover 22 includes left, right, and front side panels 24*l*, 24*r*, 24*f*, respectively, and a top panel 24*t*. The cover 22 is constructed of a plastic material that is strong enough to support such things as a computer monitor (not shown), yet light enough to be easily lifted.

The chassis 23 includes left, right and back side panels 25*l*, 25*r*, 25*b*, respectively, and a bottom panel 25*c*. The chassis 23 is slightly smaller than the cover 22 so that the cover can closed by being placed on top of and over the chassis (FIG. 1), thereby concealing all the panels 25*l*, 25*r*, 25*b* of the chassis except for the bottom panel 25*c*. The chassis 23 is constructed of a metal material that is both strong and light, like the cover 22, and that provides an electrical ground for the electrical components stored inside the cabinet 12.

The cover 22 attaches to the chassis 23 in four locations. The front panel 24*f* of the cover 22 attaches to the bottom panel 25c of the chassis 23 at points 26a and 26b. The points 26a and 26b designate hinges (not shown) that allow the cover to be rotated away from the chassis, as shown in FIG. 2. In the preferred embodiment, the hinges are situated so that when the cover 22 has been rotated 90 degrees from the chassis 23, the hinges allow the cover to separate completely from the chassis.

The left and right panels 24l and 24r also attach to the chassis using latching mechanisms 28l and 28r, respectively. Because the latching mechanisms 28l, 28r are functionally and mechanically identical, the latching mechanisms will hereinafter be referenced generically by the number 28, and each latching mechanism component described below is included on each of the latching mechanisms. Each of the latching mechanisms 28 comprise a plurality of components attached to either the cover 22 or the chassis 23.

The components of latching mechanisms 28 connected to the cover 22 include a button 30, a stop 32, and a cover hook 34. The button 30 is located in an opening 35 of the side panels 24l, 24r, so that the button may be accessed whenever the cover 22 is closed onto the chassis 23.

The components of latching mechanisms 28 connected to the chassis 23 include a leaf spring 36, and a chassis hook 38. The leaf spring is made by being cut out of the chassis side panels 25l, 25r. The leaf spring 36 includes an outward indentation portion 40 that aids in the latching, as discussed in greater detail below.

Figure 6:
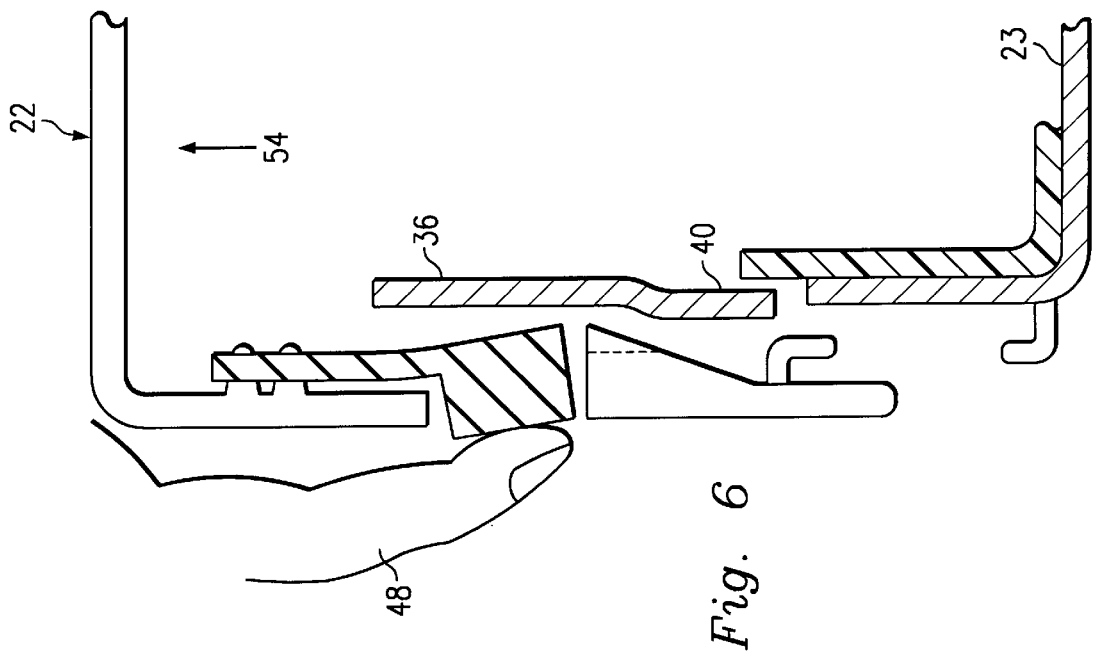
FIGS. 5–6 are closeup views of the latching mechanism of FIG. 1 during different stages of the cover being opened from the chassis.
Figure 5:
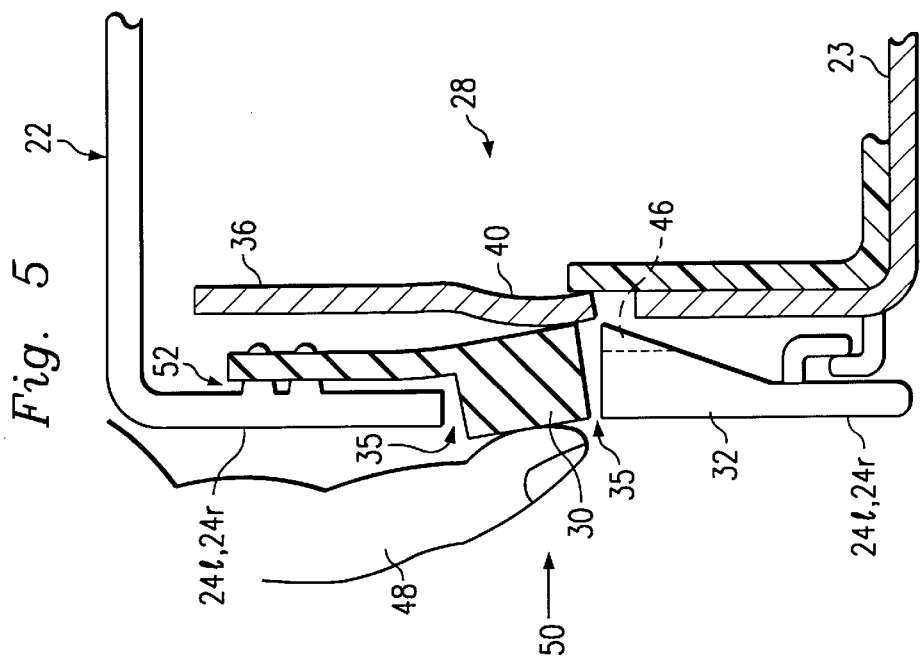

In order to fully and clearly describe the latching mechanism 28, the latching mechanism will be described at different stages in which the cover 22 is being closed onto the chassis 23, as illustrated by FIGS. 34–4, and at different stages in which the cover 22 is being opened from the chassis 23, as illustrated by FIGS. 5–6.

Referring to FIG. 3, the cover 22 is being closed upon the chassis 23, as illustrated by reference arrows 42. As the cover 22 is closing, the stop 32 moves down the leaf spring 36 toward the indentation portion 40 of the leaf spring. As the cover 22 closes further, the stop 32 compresses the leaf spring 36. The leaf spring 36 is protected from being compressed too far by a spring stay 44. The spring stay 44 also helps to prevent the leaf spring 36 from being accidentally bent from an external force, or from the components inside the chassis 23. As the cover 22 closes further, the cover hook 34 and the chassis hook 38 approach each other.

Referring to FIG. 4, once the cover 22 is fully closed upon the chassis 23, the leaf spring 36 becomes un-compressed and returns to its original, non-compressed position. When the leaf spring 36 returns to its original position, a lip portion 46 of the stop 32 comes engages with the indentation portion 40 of the leaf spring 36. As a result, the cover 22 becomes secured to the chassis 23. Any attempts to separate the cover 22 from the chassis 23 will be prevented by the lip portion 46 contacting the indentation portion 40.

In addition, when the cover 22 is closed upon the chassis 23, the cover hook 34 and the chassis hook 38 engage to prevent the side panel 24l or 24r of the cover from being pried away from the side panel 25r or 25l of the chassis. As a result, the cover 22 can not be pulled away from the chassis 23 in order to disengage the lip portion 46 from the indentation portion 40.

Referring to FIG. 5, to open the cover 22 when it is fully closed upon the chassis 23, no screwdrivers or other tools are needed. Instead, a user can open the cover 22 by using just one finger 48 to unlatch each latching mechanism 28. To unlatch the mechanism 28, the finger 48 depresses the button 30 into the opening 35 and in a direction shown by reference arrows 50. The button 30 is pivotally attached to the side panel 24l or 24r by a button hinge 52. Therefore, because the button 30 is adjacent to the leaf spring 36, when the button is depressed, it moves the indention portion 40 of the leaf spring 36 away from the lip portion 46 of the stop 32.

Referring to FIG. 6, as a result, the latching mechanism 28 is disengaged and the cover 22 can be easily opened in the direction of reference arrows 54. In so doing, the cover 22 is easily latched or unlatched from the chassis 23, without requiring any extra screws or the like. Furthermore, the latching mechanism is relatively inexpensive, while still being very reliable.

Although an illustrative embodiment of the invention has been shown and described, other modifications, changes, and substitutions are intended in the foregoing disclosure. In addition, portions of the preferred embodiment such as the chassis hook 38 and cover hook 34 can be removed or modified, while still utilizing the present invention. Accordingly, it is appropriate that the appended claims be construed broadly and in a manner consistent with the scope of the invention.

What is claimed is:

1. A computer comprising a cover, a chassis, and a latching mechanism for securing the cover to the chassis, the latching mechanism comprising:
   a first hook extending from the cover;
   a second hook extending from the chassis so that when the cover is closed on the chassis, the first hook becomes engaged with the second hook, thereby enabling the cover to resist being pried from the chassis;
   a button having one end pivotally connected to the cover allowing the button to suspend in a cantilevered manner and extend through an opening formed in the cover;
   a stop attached to the cover; and
   a leaf spring attached to the chassis, the leaf spring including an indentation so that when the cover is closed onto the chassis, the indentation engages with the stop to limit movement of the cover, thereby securing the cover to the chassis, the button being adjacent the indentation, positioned to pivot and disengage the indentation from the stop, thereby releasing the cover from the chassis.

2. The computer of claim 1 wherein, the stop includes a lip portion for engagement with the indentation.

3. The computer of claim 2 wherein movement of the button urges the indentation of the leaf spring out of engagement with the lip portion.

4. The computer of claim 1 wherein the chassis includes a spring stay that limits movement of the leaf spring and thereby protects the leaf spring from being accidentally over-extended.

5. The computer of claim 1 wherein the leaf spring is formed out of the chassis.

6. A computer comprising:
   a cover;
   a chassis;
   a latching mechanism for securing the cover to the chassis, the latching mechanism including a button having a first end pivotally connected to the cover and a second free end extending through an opening formed in the cover;
   a first hook mounted on the cover;
   a second hook mounted on the chassis so that when the cover is closed on the chassis the first hook becomes engaged with the second hook, thereby enabling the cover to resist being pried from the chassis;

a stop attached to the cover; and a leaf spring attached to the chassis, a portion of the leaf spring engaging the stop to limit movement of the cover when the cover is closed onto the chassis, thereby securing the cover to the chassis, the button being adjacent to the leaf spring, positioned to pivot and disengage the leaf spring from the stop, thereby releasing the cover from the chassis.

7. The computer of claim 6 wherein the stop includes a lip portion for engagement with the indentation.

8. The computer of claim 7 wherein movement of the button urges the indentation of the leaf spring out of engagement with the lip portion.

9. The computer of claim 7 wherein the chassis includes a spring stay that limits movement of the leaf spring and thereby protects the leaf spring from being accidentally over-extended.

10. The computer of claim 7 wherein the leaf spring is formed out of the chassis.

\* \* \* \* \*